US012149911B2

(12) United States Patent
Fukui

(10) Patent No.: US 12,149,911 B2
(45) Date of Patent: Nov. 19, 2024

(54) SIGNAL PROCESSING APPARATUS, SIGNAL PROCESSING METHOD, AND PROGRAM

(71) Applicant: SONY GROUP CORPORATION, Tokyo (JP)

(72) Inventor: Takao Fukui, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 258 days.

(21) Appl. No.: 17/904,308

(22) PCT Filed: Feb. 12, 2021

(86) PCT No.: PCT/JP2021/005239
§ 371 (c)(1),
(2) Date: Aug. 16, 2022

(87) PCT Pub. No.: WO2021/172053
PCT Pub. Date: Sep. 2, 2021

(65) Prior Publication Data
US 2023/0067510 A1 Mar. 2, 2023

(30) Foreign Application Priority Data
Feb. 25, 2020 (JP) ................................ 2020-029745

(51) Int. Cl.
*H04S 1/00* (2006.01)
*H04S 7/00* (2006.01)

(52) U.S. Cl.
CPC ................ *H04S 1/007* (2013.01); *H04S 7/30* (2013.01)

(58) Field of Classification Search
CPC . H04S 1/007; H04S 7/30; G10L 19/04; G10L 21/0388
(Continued)

(56) References Cited

U.S. PATENT DOCUMENTS

2013/0317812 A1* 11/2013 Jeong ...................... G10L 19/00 704/203
2018/0040336 A1 2/2018 Wu et al.

FOREIGN PATENT DOCUMENTS

JP 2003-264466 A 9/2003
JP 2013-007944 A 1/2013
(Continued)

OTHER PUBLICATIONS

International Search Report and Written Opinion of PCT Application No. PCT/JP2021/005239, issued on May 11, 2021, 12 pages of ISRWO.

*Primary Examiner* — Paul Kim
(74) *Attorney, Agent, or Firm* — CHIP LAW GROUP

(57) ABSTRACT

The present technology relates to a signal processing apparatus, a signal processing method, and a program that are to enable acquisition of a signal with higher sound quality.
A signal processing apparatus includes: a difference-signal generation unit configured to generate, on the basis of an input signal and a prediction coefficient that is acquired by learning with, as training data, a difference signal based on a re-quantized signal for learning acquired by re-quantization of an original sound signal and the original sound signal, the difference signal corresponding to the input signal; and a combining unit configured to combine the difference signal generated and the input signal. The present technology is applicable to a signal processing apparatus.

13 Claims, 9 Drawing Sheets

(58) Field of Classification Search
USPC .......................................................... 381/300
See application file for complete search history.

(56) References Cited

FOREIGN PATENT DOCUMENTS

| | | | |
|---|---|---|---|
| JP | 2013-528836 | A | 7/2013 |
| JP | 2014-508322 | A | 4/2014 |
| JP | 2016-528539 | A | 9/2016 |
| WO | 2019/083055 | A1 | 5/2019 |
| WO | 2020/179472 | A1 | 9/2020 |

* cited by examiner

SIGNAL PROCESSING APPARATUS, SIGNAL PROCESSING METHOD, AND PROGRAM

CROSS REFERENCE TO RELATED APPLICATIONS

This application is a U.S. National Phase of International Patent Application No. PCT/JP2021/005239 filed on Feb. 12, 2021, which claims priority benefit of Japanese Patent Application No. JP 2020-029745 filed in the Japan Patent Office on Feb. 25, 2020. Each of the above-referenced applications is hereby incorporated herein by reference in its entirety.

TECHNICAL FIELD

The present technology relates to a signal processing apparatus, a signal processing method, and a program, and particularly to a signal processing apparatus, a signal processing method, and a program that enable acquisition of signals with higher sound quality.

BACKGROUND ART

Appropriate bit expansion on an audio signal of music or the like results in acquisition of a signal with higher sound quality. For example, on a sinusoidal signal, bit extension can be achieved by, for example, filtering of a digital to analog converter (DAC).

Further, as a technique relating to high sound quality, proposed has been a technique of filtering a compressed sound source signal with a plurality of cascade-connected all-pass filters, gain-adjusting a signal acquired as a result, and adding the gain-adjusted signal and the compressed sound source signal to generate a signal with higher sound quality (see, for example, Patent Document 1).

CITATION LIST

Patent Document

Patent Document 1: Japanese Patent Application Laid-Open No. 2013-7944

SUMMARY OF THE INVENTION

Problems to be Solved by the Invention

However, a technique of achieving mathematically-based bit extension has not been proposed for typical signals of music, resulting in difficulty in acquisition of signals with higher sound quality.

For example, in the technique described in Patent Document 1, humans repeat listening and gain-value adjustment to determine the final gain value to which an auditory effect as if bit extension is performed can be added. Thus, there has been a case where a signal with high sound quality is not acquired due to no mathematical basis for the determination of the gain value.

The present technology has been made in view of such a situation, and is to enable acquisition of a signal with higher sound quality.

Solutions to Problems

A signal processing apparatus according to one aspect of the present technology includes: a difference-signal generation unit configured to generate, on the basis of an input signal and a prediction coefficient that is acquired by learning with, as training data, a difference signal based on a re-quantized signal for learning acquired by re-quantization of an original sound signal and the original sound signal, the difference signal corresponding to the input signal; and a combining unit configured to combine the difference signal generated and the input signal.

A signal processing method or a program according to one aspect of the present technology includes: a step of generating, on the basis of an input signal and a prediction coefficient that is acquired by learning with, as training data, a difference signal based on a re-quantized signal for learning acquired by re-quantization of an original sound signal and the original sound signal, the difference signal corresponding to the input signal; and a step of combining the difference signal generated and the input signal.

In one aspect of the present technology, on the basis of an input signal and a prediction coefficient that is acquired by learning with, as training data, a difference signal based on a re-quantized signal for learning acquired by re-quantization of an original sound signal and the original sound signal, the difference signal corresponding to the input signal is generated, and the difference signal generated and the input signal are combined.

MODE FOR CARRYING OUT THE INVENTION

Figure 1:
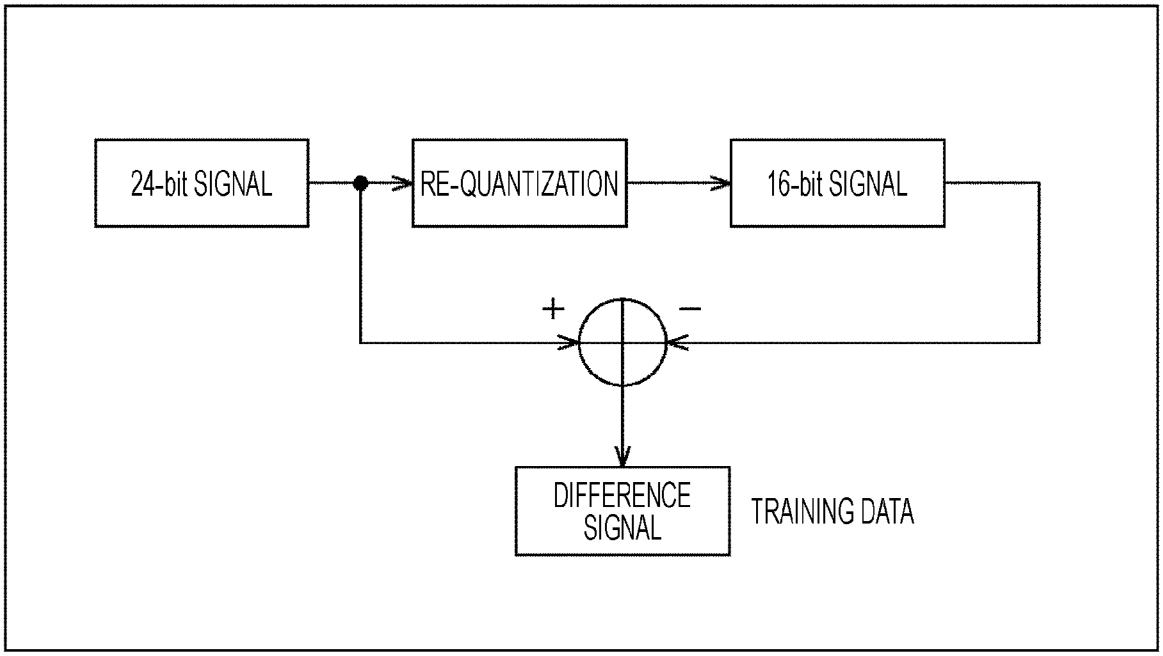
FIG. 1 explanatorily illustrates generation of a difference signal.

Hereinafter, embodiments to which the present technology is applied will be described with reference to the drawings.

First Embodiment

<About Present Technology>

High-resolution (hereinafter, referred to as high-res) content of music has been distributed for several years. However, such high-res content mostly includes old sound sources like in the 60's and newly recorded sound sources, and there is almost no content in the heyday of compact disc (CD), for example, in the 80's when music was the most popular.

This is because a CD at that time is produced with a 16-bit/44.1 kHz CD mastering apparatus, and only a master sound source having the same format of 16-bit/44.1 kHz as that of the CD is present.

Thus, even when people desire to listen to, at high-res, the content of a CD at that time, there is no way for the people to listen to, at high-res, such content. As a result, such people only listen to the content subjected to an auditory effect like high-res content.

Therefore, in the present technology, for example, a difference signal as difference between a pulse code modulation (PCM) signal as a high-res original sound signal newly recorded and a low-quality re-quantized signal generated from the original sound signal is used as training data, and learning of the difference signal from the re-quantized signal enables a typical audio signal of music or the like to be a high sound quality (high-res) signal.

In such a manner, a typical 16-bit signal of, for example, a CD without a high-res master sound source is transformed into a high-res signal, so that, for example, a 24-bit signal with high sound quality can be acquired.

In particular, in the present technology, for example, machine learning with a network in consideration of the features of audio signals is performed as learning of difference signals.

Note that in the following, a case where machine learning is performed with, as a re-quantized signal, a 16-bit signal (16-bit PCM signal) acquired by re-quantization of a 24-bit signal, for example, a 24-bit PCM signal of music as an original sound signal will be described as an example.

In particular, hereinafter, a 24-bit signal (original sound signal) for learning in use for machine learning is also referred to as a 24-bit signal for learning (original sound signal for learning). Similarly, a 16-bit signal (re-quantized signal) acquired from the original sound signal for learning is also referred to as a 16-bit signal for learning (re-quantized signal for learning). Further, in the following description, a difference signal acquired from the original sound signal for learning and the re-quantized signal for learning and used as training data is also particularly referred to as a difference signal for learning.

In a case where machine learning is performed on the basis of a 16-bit signal for learning and a difference signal for learning, a typical 16-bit signal of, for example, a CD is used as an input signal, and the input signal is brought into high sound quality to acquire a high sound quality signal as a 24-bit signal. Note that such 16-bit signal and 24-bit signal are audio signals each having a quantization bit length, that is, the bit length for one sample is 16 bits or 24 bits.

First, generation of a difference signal for learning will be described.

For example, as illustrated in FIG. 1, a 24-bit signal is prepared as an original sound signal for learning with high sound quality.

Then, the 24-bit signal is re-quantized by, for example, simple truncation, dither rounding, or noise shaping with various noise shapers to generate a 16-bit signal as a re-quantized signal for learning lower in sound quality than the 24-bit signal. That is, re-quantization is performed on the 24-bit signal, and a 16-bit signal smaller in quantization bit length than the 24-bit signal is generated as a re-quantized signal for learning.

Further, an 8-bit signal as a difference signal for learning is generated by obtaining difference between the 24-bit signal and the 16-bit signal. With the acquired difference signal for learning as training data, a prediction coefficient (predictor) for predicting (generating) a difference signal from a 16-bit signal is generated by machine learning.

For example, at the time of machine learning, learning is performed with a deep neural network (DNN) having a configuration considering the features of an audio signal such as a correlation of several 100 ms, a harmonic structure in a spectrum, and rhythm. That is, a prediction coefficient in use for prediction calculation of a difference signal in a DNN or the like is learned as a parameter.

Use of a prediction coefficient acquired by such machine learning results in acquisition of, with a freely-selected 16-bit audio signal (16-bit signal) as an input signal, a difference signal to the input signal by prediction on the basis of the input signal and the prediction coefficient.

Thus, addition (combination of) of the difference signal acquired by the prediction to the input signal results in acquisition of, as a high sound quality signal, a 24-bit signal higher in sound quality than the input signal.

Figure 2:
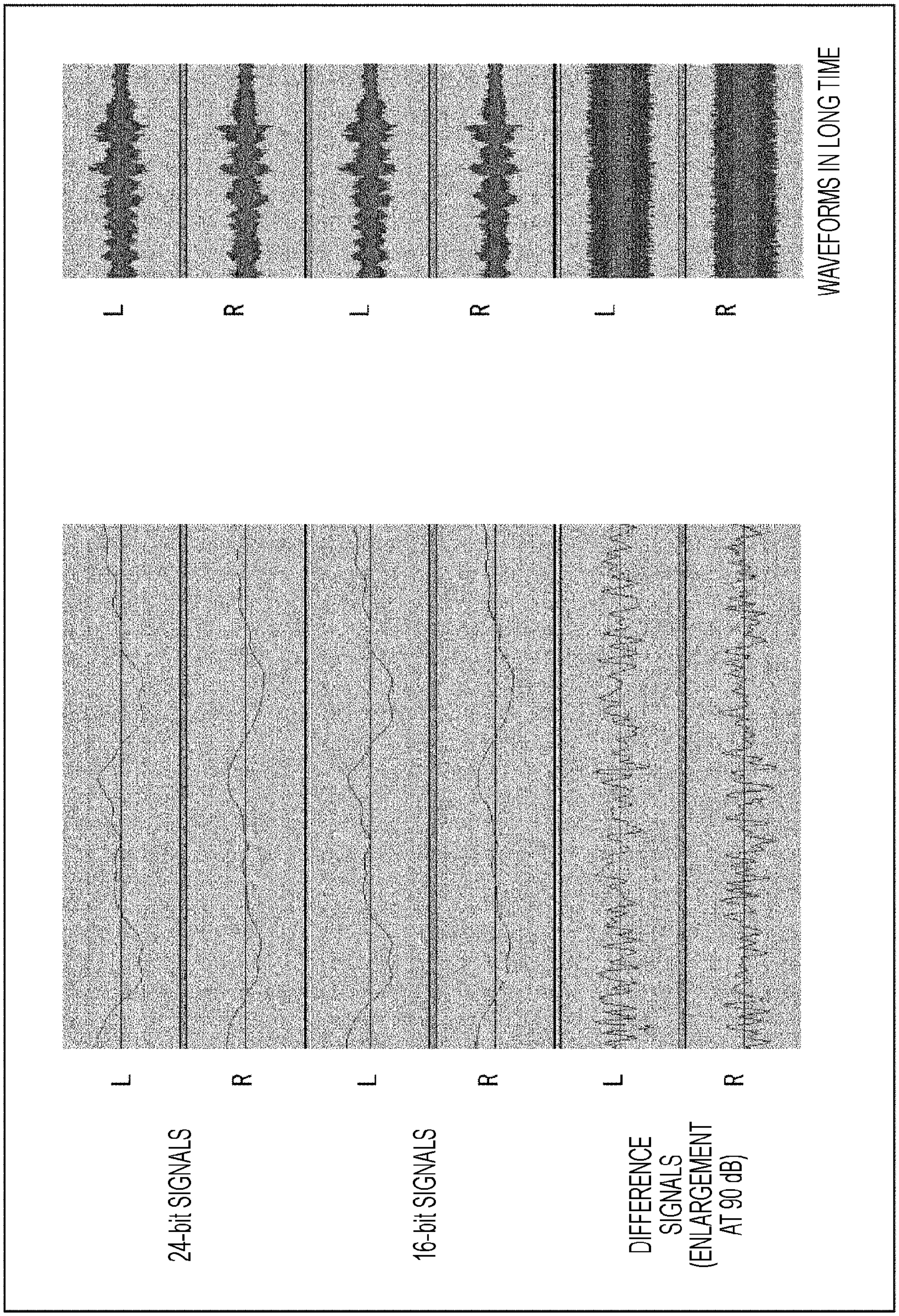
FIG. 2 illustrates exemplary 24-bit signals, 16-bit signals, and difference signals.

Examples of such 24-bit signal, 16-bit signal, and difference signal as above are illustrated in FIG. 2. Note that in FIG. 2, the horizontal axis represents time and the vertical axis represents a signal level.

In FIG. 2, the respective time waveforms of an L-channel 24-bit signal and an R-channel 24-bit signal in stereo, the respective waveforms of an L-channel 16-bit signal and an R-channel 16-bit signal in stereo, and the respective waveforms of an L-channel difference signal and an R-channel difference signal in stereo in a relatively short-time interval are illustrated on the left.

In particular, the L-channel 24-bit signal, the R-channel 24-bit signal, the L-channel 16-bit signal, the R-channel 16-bit signal, the L-channel difference signal, and the R-channel difference signal are arranged in this order from the top to the bottom in the figure.

Further, on the right of the figure, the respective time waveforms of the 24-bit signals, the 16-bit signals, and the difference signals illustrated on the left of the figure are illustrated in a relatively long-time interval. Note that in FIG. 2, the difference signals are each enlarged at 90 dB and displayed.

As described above, a 16-bit signal can be acquired by re-quantization of a 24-bit signal, and a difference signal as an 8-bit signal can be acquired by calculation of difference between the 16-bit signal and the 24-bit signal. Then, with the difference signal is used as training data, machine learning based on the prediction coefficient and the 16-bit signal is performed to acquire a prediction coefficient for predicting a difference signal from a freely selected 16-bit signal.

As above, according to the present technology, a prediction coefficient for predicting a difference signal is generated by machine learning and a difference signal is predicted on the basis of the coefficient signal to perform a bit extension by a mathematical technique. As a result, a high sound quality signal can be acquired.

In particular, in the present technology, the difference signal is mathematically generated (determined) by prediction calculation with the prediction coefficient acquired by the machine learning. Thus, adjustment of parameters such as a gain value by conventionally repeated listening is eliminated.

Therefore, as compared with a manual adjustment of the parameters, variations in the acquired effects can be suppressed and the sound quality can be equally improved for any input signal. That is, a high sound quality signal with higher sound quality can be acquired.

Note that the technique of predicting a difference signal and the technique of learning a prediction coefficient are not limited to the above prediction technique and machine learning technique, and thus any other technique may be used.

<Exemplary Configuration of Signal Processing Apparatus>

Figure 3:
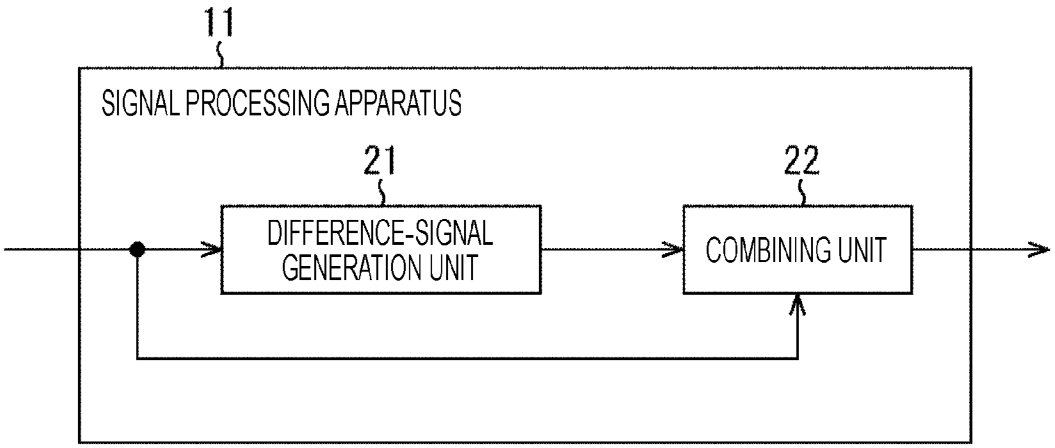
FIG. 3 illustrates an exemplary configuration of a signal processing apparatus.

FIG. 3 illustrates an exemplary configuration of an embodiment of a signal processing apparatus to which the present technology is applied.

A signal processing apparatus 11 illustrated in FIG. 3 includes a difference-signal generation unit 21 and a combining unit 22.

A signal, that is, a signal in the time domain, that is, a time signal is supplied to the signal processing apparatus 11 as an input signal. For example, the input signal is a 16-bit signal, particularly a 16-bit PCM signal of music or the like. For example, the input signal is a signal having the same bit length (quantization bit length) and sampling frequency as a re-quantized signal for learning used for learning a prediction coefficient.

The difference-signal generation unit 21 holds prediction coefficients acquired in advance by machine learning as parameters, and functions as a predictor that predicts a difference signal corresponding to the supplied input signal.

That is, the difference-signal generation unit 21 performs prediction calculation on the basis of such a held prediction coefficient and the supplied input signal to generate a difference signal corresponding to the input signal by prediction, and then supplies the acquired difference signal to the combining unit 22.

The combining unit 22 combines (adds) the difference signal supplied from the difference-signal generation unit 21 and the supplied input signal to generate a high sound quality signal, and then outputs the high sound quality signal to the subsequent stage.

In particular, in the combining unit 22, a 24-bit signal with higher sound quality is acquired as a high sound quality signal larger in bit length (quantization bit length) of the sample value for one sample than the 16-bit signal as the input signal.

<Exemplary Configuration of Difference-Signal Generation Unit>

Figure 4:
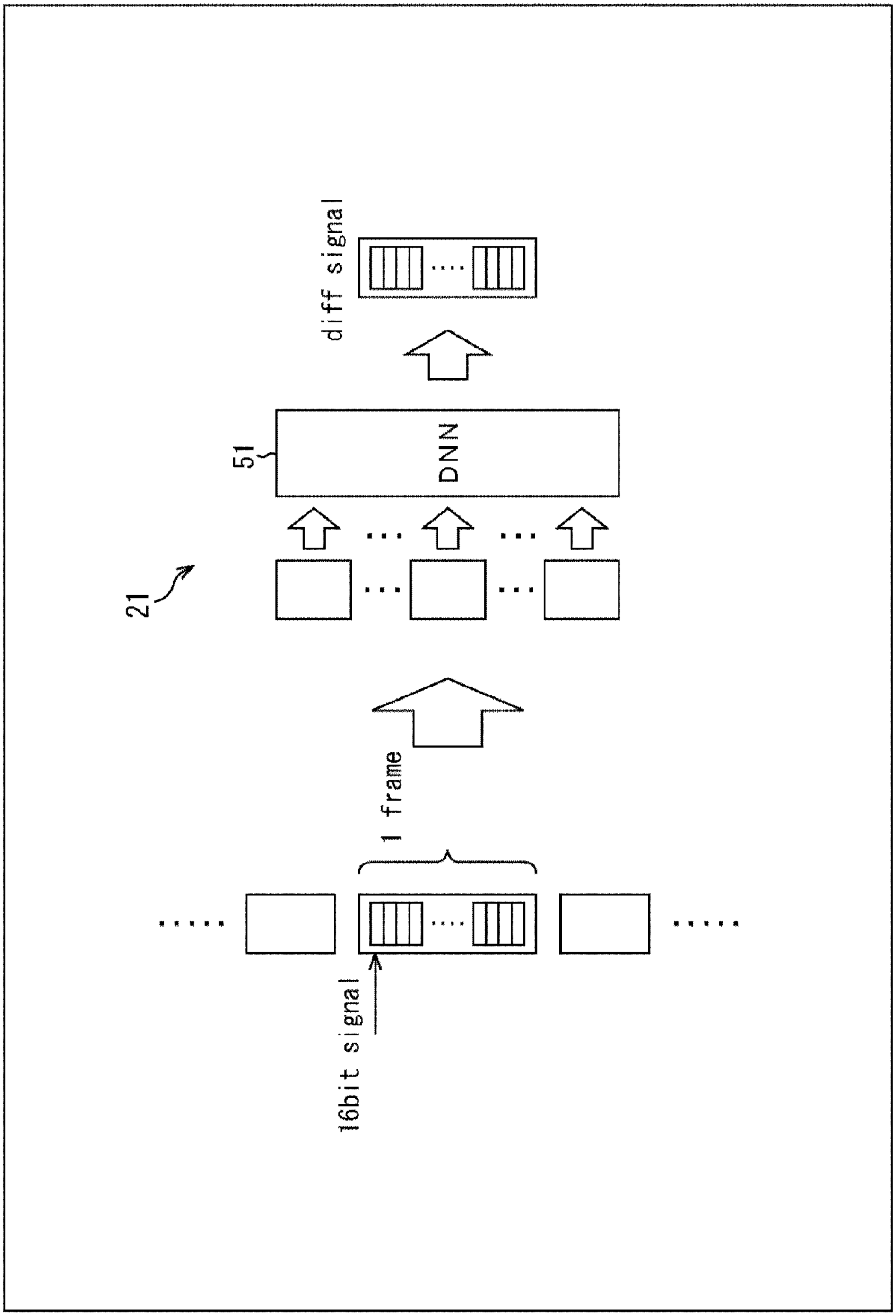
FIG. 4 illustrates an exemplary configuration of a difference-signal generation unit.

In addition, the difference-signal generation unit 21 is configured as illustrated in FIG. 4, for example.

In the example illustrated in FIG. 4, the difference-signal generation unit 21 includes a DNN 51 that performs prediction calculation on the basis of a prediction coefficient acquired by machine learning.

In this example, processing is performed on a 16-bit signal as an input signal, on a frame basis such as 1024 samples.

That is, in this example, M number (e.g., M=10) of frames in succession including the current frame as a processing target of the 16-bit signal are input to the DNN 51.

For example, here, the M=10 frames of signals in succession including the current frame of 16-bit signal, such as a past frame temporally before the current frame and a future frame temporally after the current frame, are input to the DNN 51. In other words, 10 frames of signals of the 16-bit signal are added (combined) to be a single signal, and the single signal is used as input to the DNN 51.

Note that, in the signal processing apparatus 11, in a case where a temporal delay is not allowed, for example, the current frame and nine past frames immediately before the current frame may be used as input to the DNN 51 without a future frame.

The DNN 51 functions as a prediction unit that predicts a difference signal in the time domain on the basis of a 16-bit signal and a prediction coefficient. In other words, in this example, the prediction unit includes the DNN 51.

The DNN 51 performs prediction calculation on the basis of the input M number of frames of 16-bit signals and a prediction coefficient held in advance, and supplies the combining unit 22 with a difference signal in the time domain to the current frame acquired as a result. More specifically, one frame of time signal corresponding to the difference signal to the input 16-bit signal acquired by the prediction based on the prediction coefficient is supplied to the combining unit 22.

For example, in the prediction calculation in the DNN 51, performed on a 16-bit signal is convolution processing, non-linear processing such as calculation processing with an activation function, or the like.

<Description of Signal Generation Processing>

Next, the operation of the signal processing apparatus 11 will be described.

Figure 5:
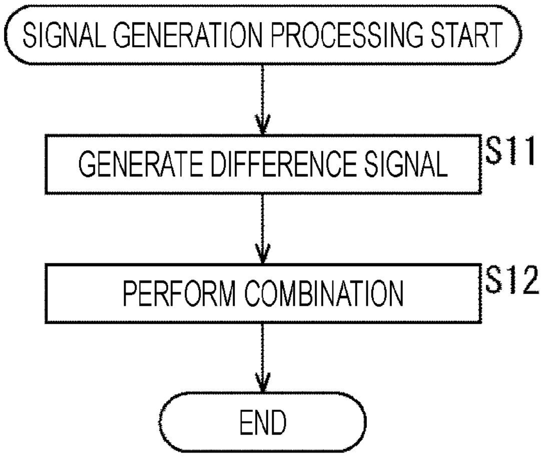
FIG. 5 is an explanatory flowchart of signal generation processing.

That is, signal generation processing performed by the signal processing apparatus 11 will be described below with reference to the flowchart of FIG. 5.

In step S11, the difference-signal generation unit 21 generates a difference signal on the basis of a 16-bit signal as a supplied input signal and a prediction coefficient held in advance.

Specifically, on the basis of the supplied M number of frames of 16-bit signals and a prediction coefficient held in advance, the DNN 51 functioning as the difference-signal generation unit 21 predicts a difference signal to the current frame by prediction calculation, and supplies the difference signal acquired as a result to the combining unit 22.

In step S12, the combining unit 22 combines (adds) the difference signal to the current frame supplied from the difference-signal generation unit 21, that is, from the DNN 51, and the current frame of 16-bit signal as the supplied input signal, and then outputs, to the subsequent stage, a high sound quality signal to the current frame acquired as a result.

In the signal processing apparatus 11, the above processing is performed on each frame of the 16-bit signal, and a 24-bit signal as a high sound quality signal is generated. When the high sound quality signal is generated in such a manner, the signal generation processing ends.

As described above, the signal processing apparatus 11 generates a difference signal with a prediction coefficient acquired in advance by machine learning, and combines the difference signal and an input signal to acquire a high sound quality signal. In such a manner, bit expansion (bringing into high sound quality) is performed on the input signal by a mathematical technique, and a high sound quality signal with higher sound quality can be acquired.

2. Second Embodiment

<Exemplary Configuration of Difference-Signal Generation Unit>

Meanwhile, the configuration of the difference-signal generation unit 21 illustrated in FIG. 4 is strong in the randomness of the time characteristics of a difference signal. Thus, a prediction error may increase due to insufficient learning of the features of the difference signal. In other words, it may be difficult to extract an appropriate feature amount in the time domain (time waveform), and in such a case, the accuracy of predicting a difference signal may be deteriorated.

Therefore, for an audio signal, a difference signal may be predicted with frequency characteristics easy to understand the features of the audio signal.

Figure 6:
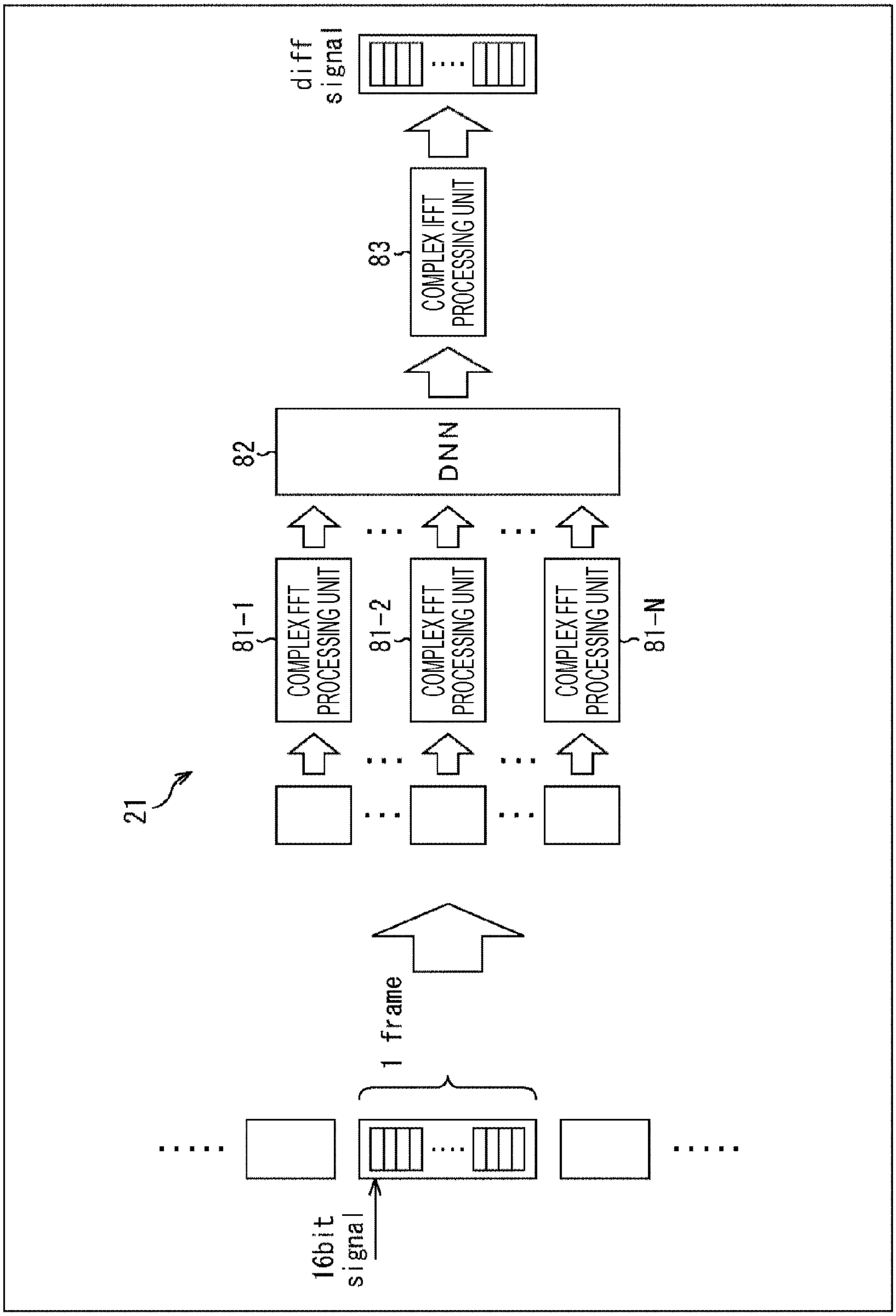
FIG. 6 illustrates an exemplary configuration of a difference-signal generation unit.

In such a case, a difference-signal generation unit 21 is configured as illustrated in FIG. 6, for example.

The difference-signal generation unit 21 illustrated in FIG. 6 includes a complex fast Fourier transform (FFT) processing units 81-1 to 81-N, a DNN 82, and a complex inverse fast Fourier transform (IFFT) processing unit 83.

In this example, N number of (e.g., N=10) frames in succession including the current frame as a processing target of a 16-bit signal in the time domain as an input signal are input to the difference-signal generation unit 21.

That is, in the example illustrated in FIG. 6, the N number of frames of signals of the 16-bit signal are supplied one-to-one to the complex FFT processing units 81-1 to 81-N. Note that, also in this case, similarly to the example illustrated in FIG. 4, the N number of frames in succession may include a future frame and a past frame, or may include only the current frame and a past frame without including a future frame.

The complex FFT processing units 81-1 to 81-N each perform complex FFT on the corresponding supplied one frame of 16-bit signal, and supply a signal acquired as a result to the DNN 82.

Such complex FFT for the 16-bit signal is performed to acquire the frequency axis data of the 16-bit signal, that is, the signal in the frequency domain. Note that, hereinafter, the complex FFT processing units 81-1 to 81-N are also simply referred to as complex FFT processing units 81 in a case where it is not particularly necessary to distinguish them.

The DNN 82 functions as a prediction unit that predicts a difference signal in the frequency domain on the basis of frequency axis data as a 16-bit signal in the frequency domain and a prediction coefficient.

That is, the DNN 82 performs prediction calculation on the basis of N number of frames of frequency axis data of a 16-bit signal supplied from the complex FFT processing units 81 and a prediction coefficient held in advance, and supplies the complex IFFT processing unit 83 with a difference signal in the frequency domain to the current frame acquired as a result. More specifically, one frame of signal in the frequency domain corresponding to the difference signal to the input 16-bit signal acquired by the prediction based on the prediction coefficient is supplied to the complex IFFT processing unit 83.

In this case, the prediction coefficient held by the DNN 82 is a prediction coefficient for predicting a difference signal in the frequency domain from the signal in the frequency domain of the 16-bit signal acquired by machine learning with the difference signal in the frequency domain as training data. Also in this case, in the DNN 82, similarly to the case of the DNN 51, convolution processing, non-linear processing such as calculation processing with an activation function, or the like is performed as the prediction calculation.

The complex IFFT processing unit 83 performs complex IFFT on the difference signal in the frequency domain supplied from the DNN 82, and supplies a difference signal in the time domain acquired as a result to a combining unit 22.

The difference-signal generation unit 21 illustrated in FIG. 6 performs complex FFT on a 16-bit signal and predicts a difference signal in the frequency domain.

Performing of the complex FFT in such a manner enables prediction in the frequency domain in which feature extraction is easy in an audio signal. Moreover, not only the amplitude but also the phase of the signal is considered. Thus, a sufficient effect can be acquired even in the time waveform, that is, in the time domain. That is, a signal with sufficient accuracy as a difference signal in the time domain can be acquired.

Even in the case where the difference-signal generation unit 21 has the configuration illustrated in FIG. 6, a signal processing apparatus 11 basically performs such signal generation processing as described with reference to FIG. 5.

However, in step S11, the complex FFT processing units 81, the DNN 82, and the complex IFFT processing unit 83 each generate a difference signal.

That is, N number of complex FFT processing units 81 each perform complex FFT on the corresponding supplied one frame of signal of a 16-bit signal, and supplies a signal acquired as a result to the DNN 82.

Further, the DNN 82 performs prediction calculation on the basis of N number of frames of signals in total supplied from the N number of complex FFT processing units 81 and a prediction coefficient held in advance, and supplies a signal acquired as a result to the complex IFFT processing unit 83.

Furthermore, the complex IFFT processing unit 83 performs complex IFFT on the signal supplied from the DNN 82, and supplies a difference signal acquired as a result to the combining unit 22. Therefore, in step S12, the combining unit 22 combines the difference signal supplied from the complex IFFT processing unit 83 and the 16-bit signal as the supplied input signal to generate a high sound quality signal.

Even in a case where a difference signal is predicted in the frequency domain as above, a signal with higher sound quality can be acquired.

3. Third Embodiment

<Exemplary Configuration of Difference-Signal Generation Unit>

In the second embodiment, because the processing is performed in the frequency domain, a difference signal can be predicted relatively easy as compared with the case in the first embodiment. However, due to the use of the complex FFT, it is unlikely to predict a difference signal with sufficient accuracy in a case where the input signal is an aperiodic signal.

Therefore, a single difference signal may be finally acquired by combining such prediction in the time domain as in the first embodiment and such prediction in the frequency domain as in the second embodiment.

Figure 7:
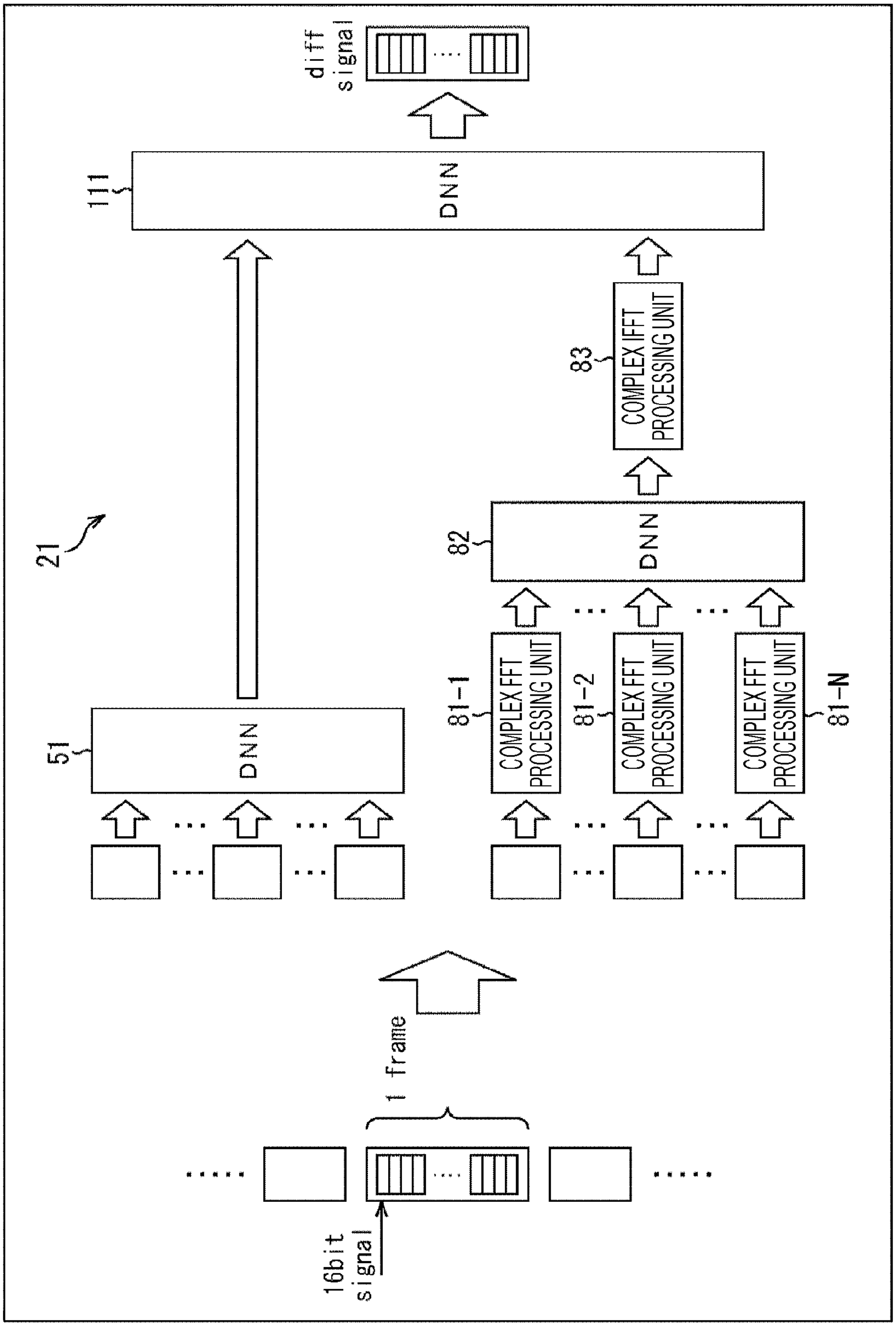
FIG. 7 illustrates an exemplary configuration of a difference-signal generation unit.

In such a case, a difference-signal generation unit 21 is configured as illustrated in FIG. 7, for example. Note that parts in FIG. 7 corresponding to those in FIG. 4 or 6 are denoted with the same reference signs, and the description thereof will be omitted as appropriate.

The difference-signal generation unit 21 illustrated in FIG. 7 includes a DNN 51, complex FFT processing units 81-1 to 81-N, a DNN 82, a complex IFFT processing unit 83, and a DNN 111.

In this example, in the difference-signal generation unit 21, output of the DNN 51 and output of the complex IFFT processing unit 83 are supplied to the DNN 111.

The DNN 111 functions as a prediction unit that predicts a final difference signal in the time domain on the basis of a prediction coefficient, the prediction result from the DNN 51, and the prediction result from the DNN 82.

In the DNN 111, held in advance is a prediction coefficient for predicting a difference signal in the time domain with, as inputs, the output of the DNN 51 and the output of the complex IFFT processing unit 83 generated by machine learning with a difference signal for learning in the time domain as training data. Note that, for example, a prediction coefficient held by the DNN 51, a prediction coefficient held by the DNN 82, and the prediction coefficient held by the DNN 111 are simultaneously generated by machine learning.

The DNN 111 performs prediction calculation on the basis of the prediction coefficient held in advance, the one frame of signal (difference signal) supplied from the DNN 51, and the one frame of signal (difference signal) supplied from the complex IFFT processing unit 83, and supplies a signal acquired as a result to a combining unit 22, as the prediction result of a final difference signal. That is, one frame of signal in the time domain corresponding to the difference signal to the input 16-bit signal acquired by the prediction based on the prediction coefficient is output from the DNN 111 to the combining unit 22.

Note that M number of frames of signals are input to the DNN 51 and N number of frames of signals are input to the DNN 82. However, the number of frames of signals to be input to the DNN 51 and the number of frames of signals to be input to the DNN 82 may be the same (M=N) or may be different.

Even in the case where the difference-signal generation unit 21 has the configuration illustrated in FIG. 7, a signal processing apparatus 11 basically performs such signal generation processing as described with reference to FIG. 5.

However, in step S11, the DNN 51, the complex FFT processing units 81-1 to 81-N, the DNN 82, the complex IFFT processing unit 83, and the DNN 111 each generate a difference signal.

That is, the DNN 51 performs prediction calculation on the basis of the supplied M number of frames of 16-bit signals and a prediction coefficient held in advance, and supplies a signal acquired as a result to the DNN 111.

Further, the complex FFT processing units 81 each perform complex FFT on the corresponding supplied one frame of signal of a 16-bit signal, and supplies a signal acquired as a result to the DNN 82. The DNN 82 performs prediction calculation on the basis of N number of frames of signals in total supplied from the complex FFT processing units 81 and a prediction coefficient held in advance, and supplies a signal acquired as a result to the complex IFFT processing unit 83.

The complex IFFT processing unit 83 performs complex IFFT on the signal supplied from the DNN 82 and supplies a signal acquired as a result to the DNN 111.

Further, the DNN 111 performs prediction calculation on the basis of a prediction coefficient held in advance, the signal supplied from the DNN 51, and the signal supplied from the complex IFFT processing unit 83, and supplies the combining unit 22 with a difference signal in the time domain to the current frame acquired as a result. Therefore, in step S12, the combining unit 22 combines the difference signal supplied from the DNN 111 and the 16-bit signal as the supplied input signal to generate a high sound quality signal.

The prediction in the time domain and the prediction in the frequency domain are combined with each other as above, so that a high sound quality signal with higher sound quality can be acquired.

4. Fourth Embodiment

<Exemplary Configuration of Difference-Signal Generation Unit>

In addition, in the configuration of the difference-signal generation unit 21 illustrated in FIG. 7, the prediction in the time domain and the prediction in the frequency domain are performed, and weak points in both the predictions are covered. However, the feature amount on the time axis, that is, the prediction result in the DNN 51, and the feature amount on the frequency axis, that is, the prediction result in the DNN 82 are treated equally. Thus, in the final prediction result, either weight may come out too strongly. That is, in the prediction result of a final difference signal, the influence of either the prediction in the time domain or the prediction in the frequency domain may become strong.

Therefore, the feature amount on the time axis and the feature amount on the frequency axis may be temporarily separated and may be each transformed into a variable (feature amount) different in dimension. Then, each of the results may be input to a DNN to predict one frame of signal corresponding to a difference signal to an input 16-bit signal. This arrangement enables prediction of a difference signal more stable with sufficient accuracy.

Figure 8:
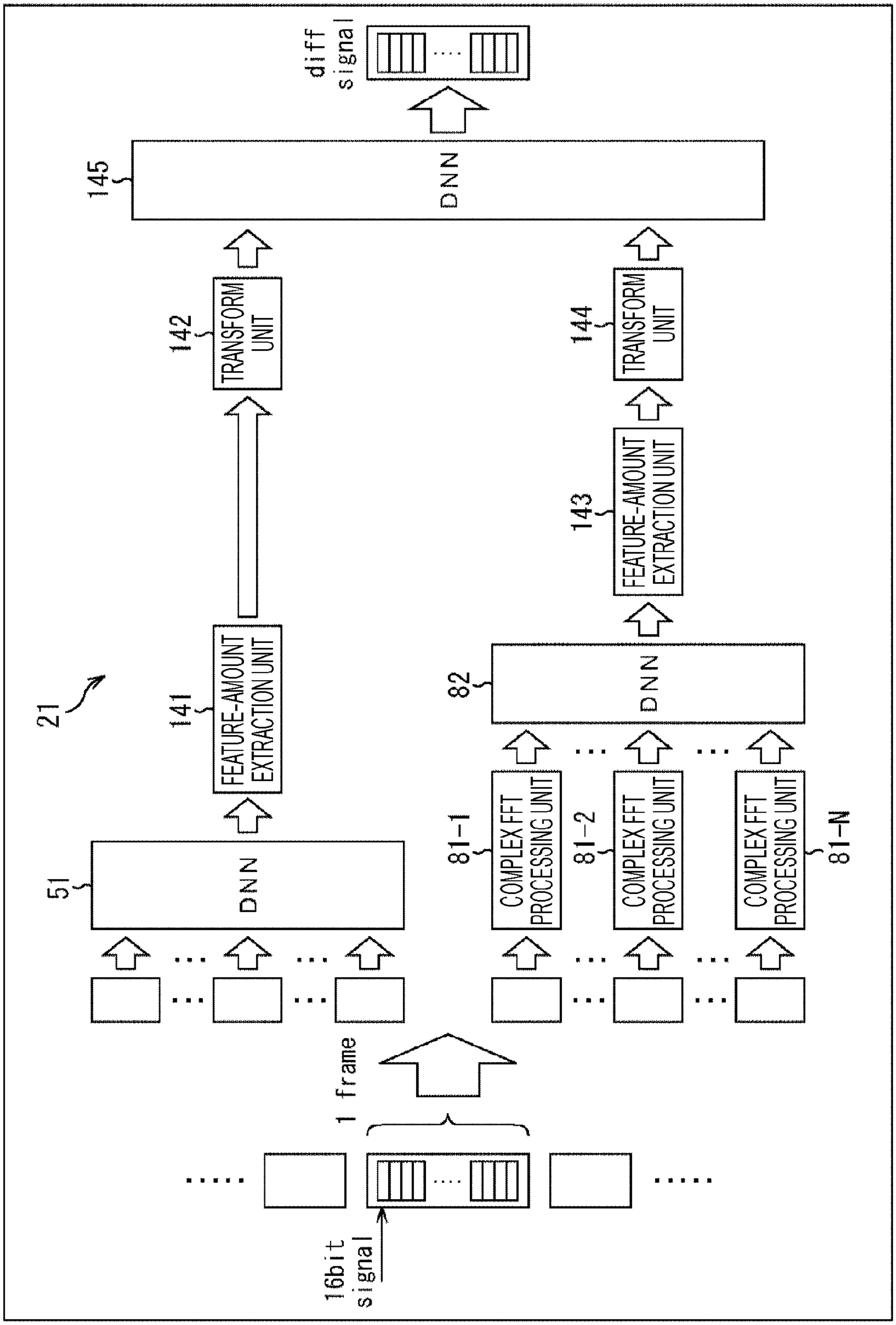
FIG. 8 illustrates an exemplary configuration of a difference-signal generation unit.

In a case where transform to a feature amount different in dimension is performed in such a manner, a difference-signal generation unit 21 is configured as illustrated in FIG. 8, for example. Note that parts in FIG. 8 corresponding to those in FIG. 7 are denoted with the same reference signs, and the description thereof will be omitted as appropriate.

The difference-signal generation unit 21 illustrated in FIG. 8 includes a DNN 51, a feature-amount extraction unit 141, a transform unit 142, complex FFT processing units 81-1 to 81-N, a DNN 82, a feature-amount extraction unit 143, a transform unit 144, and a DNN 145.

The configuration of the difference-signal generation unit 21 illustrated in FIG. 8 is different from that of the difference-signal generation unit 21 in FIG. 7 in that the feature-amount extraction unit 141, the transform unit 142, the feature-amount extraction unit 143, the transform unit 144, and the DNN 145 are newly provided instead of the complex IFFT processing unit 83 and the DNN 111, and is the same as that of the difference-signal generation unit 21 in FIG. 7 in other points.

In the example of FIG. 8, the feature-amount extraction unit 141 extracts the feature amount on the time axis from a signal (prediction result of a difference signal in the time domain) supplied from the DNN 51, and supplies the feature amount to the transform unit 142.

Note that, in the feature-amount extraction unit 141, the output itself of the DNN 51, that is, a value based on the features of errors, as a prediction target, between an input 16-bit signal and a 24-bit signal, such as 0.01 bits, −0.02 bits, 0.2 bits, . . . , and others in chronological order may be used as the feature amount on the time axis as it is.

The transform unit 142 transforms the feature amount on the time axis supplied from the feature-amount extraction unit 141 into a variable different in dimension from the time axis, that is, a feature amount different in dimension from the feature amount on the time axis, and supplies the transformed feature amount to the DNN 145.

The feature-amount extraction unit 143 extracts the feature amount on the frequency axis from a signal (prediction result of a difference signal in the frequency domain) supplied from the DNN 82, and supplies the feature amount to the transform unit 144.

Note that, in the feature-amount extraction unit 143, the output itself of the DNN 82, that is, a value based on the features of FFT errors, as a prediction target, between an input 16-bit signal and a 24-bit signal acquired by arranging the amplitude (dB) and the phase (deg) of each frequency bin, such as 0.01 dB/0.03 deg, −0.011 dB/−0.2 deg, . . . , and others, may be used as the feature amount on the frequency axis as it is.

The transform unit 144 transforms the feature amount on the frequency axis supplied from the feature-amount extraction unit 143 into a variable different in dimension from the frequency axis, that is, a feature different in dimension from the feature amount on the frequency axis, and supplies the transformed feature amount to the DNN 145.

In the transform unit 142 and the transform unit 144, the supplied feature amounts are each transformed into the feature amount different in dimension from the time (time axis) and the frequency (frequency axis), such as a 1024×1024 matrix in seconds. In other words, the feature amount on the time axis and the feature amount on the frequency axis are each projected onto a region different in dimension.

At this time, the feature amounts may be transformed such that the feature amount acquired by the transform unit 142 and the feature amount acquired by the transform unit 144 have the same dimension, or the feature amounts may be transformed such that the feature amounts are different in dimension. Such transform into a feature amount different in dimension is called, for example, dimension transform.

The DNN 145 functions as a prediction unit that predicts a final difference signal in the time domain on the basis of a prediction coefficient, the feature amount acquired by the transform unit 142, and the feature amount acquired by the transform unit 144.

In the DNN 145, held in advance is a prediction coefficient for predicting a difference signal in the time domain with, as inputs, the output of the transform unit 142 and the output of the transform unit 144 generated by machine learning with a difference signal for learning in the time domain as training data.

Note that, for example, a prediction coefficient held by the DNN 51, a prediction coefficient held by the DNN 82, and the prediction coefficient held by the DNN 145 are simultaneously generated by machine learning.

The DNN 145 performs prediction calculation on the basis of the prediction coefficient held in advance, the feature amount supplied from the transform unit 142, and the feature amount supplied from the transform unit 144, and supplies a signal acquired as a result to a combining unit 22, as the prediction result of a final difference signal. That is, one frame of signal in the time domain corresponding to the difference signal to an input 16-bit signal acquired by the prediction based on the prediction coefficient is supplied from the DNN 145 to the combining unit 22.

Even in the case where the difference-signal generation unit 21 has the configuration illustrated in FIG. 8, a signal processing apparatus 11 basically performs such signal generation processing as described with reference to FIG. 5.

However, in step S11, the DNN 51, the feature-amount extraction unit 141, the transform unit 142, the complex FFT processing units 81-1 to 81-N, the DNN 82, the feature-amount extraction unit 143, the transform unit 144, and the DNN 145 each generate a difference signal.

That is, the DNN 51 performs prediction calculation on the basis of the supplied M number of frames of 16-bit signals and the prediction coefficient held in advance, and supplies a signal acquired as a result to the feature-amount extraction unit 141.

The feature-amount extraction unit 141 extracts the feature amount on the time axis from the signal supplied from the DNN 51, and supplies the feature amount to the transform unit 142. The transform unit 142 transforms the feature amount on the time axis supplied from the feature-amount extraction unit 141 into a feature amount different in dimension from the time axis, and supplies the transformed feature amount to the DNN 145.

Further, the complex FFT processing units 81 each perform complex FFT on the corresponding supplied one frame of signal of a 16-bit signal, and supplies a signal acquired as a result to the DNN 82. The DNN 82 performs prediction calculation on the basis of N number of frames of signals in total supplied from the complex FFT processing units 81 and the prediction coefficient held in advance, and supplies a signal acquired as a result to the feature-amount extraction unit 143.

The feature-amount extraction unit 143 extracts the feature amount on the frequency axis from the signal supplied from the DNN 82, and supplies the feature amount to the transform unit 144. The transform unit 144 transforms the feature amount on the frequency axis supplied from the feature-amount extraction unit 143 into a feature amount different in dimension from the frequency axis, and supplies the transformed feature amount to the DNN 145.

Further, the DNN 145 performs prediction calculation on the basis of the prediction coefficient held in advance, the feature amount supplied from the transform unit 142, and the feature amount supplied from the transform unit 144, and supplies the combining unit 22 with a difference signal in the time domain to the current frame acquired as a result. Therefore, in step S12, the combining unit 22 combines the difference signal supplied from the DNN 145 and the 16-bit signal as the supplied input signal to generate a high sound quality signal.

As above, a feature amount on the time axis and a feature amount on the frequency axis are each transformed into a feature amount different in dimension and the final difference signal is predicted on the basis of those transformed feature amounts to acquire a difference signal more stably with sufficient accuracy. As a result, and a high sound quality signal with higher sound quality can be acquired.

<Exemplary Configuration of Computer>

Meanwhile, the above flow of processing can be performed with hardware or software. In order to perform the flow of processing with software, a program included in the software is installed in a computer. Here, examples of the computer include a computer embedded in dedicated hardware and a general-purpose personal computer that is executable for various functions by installation of various programs.

Figure 9:
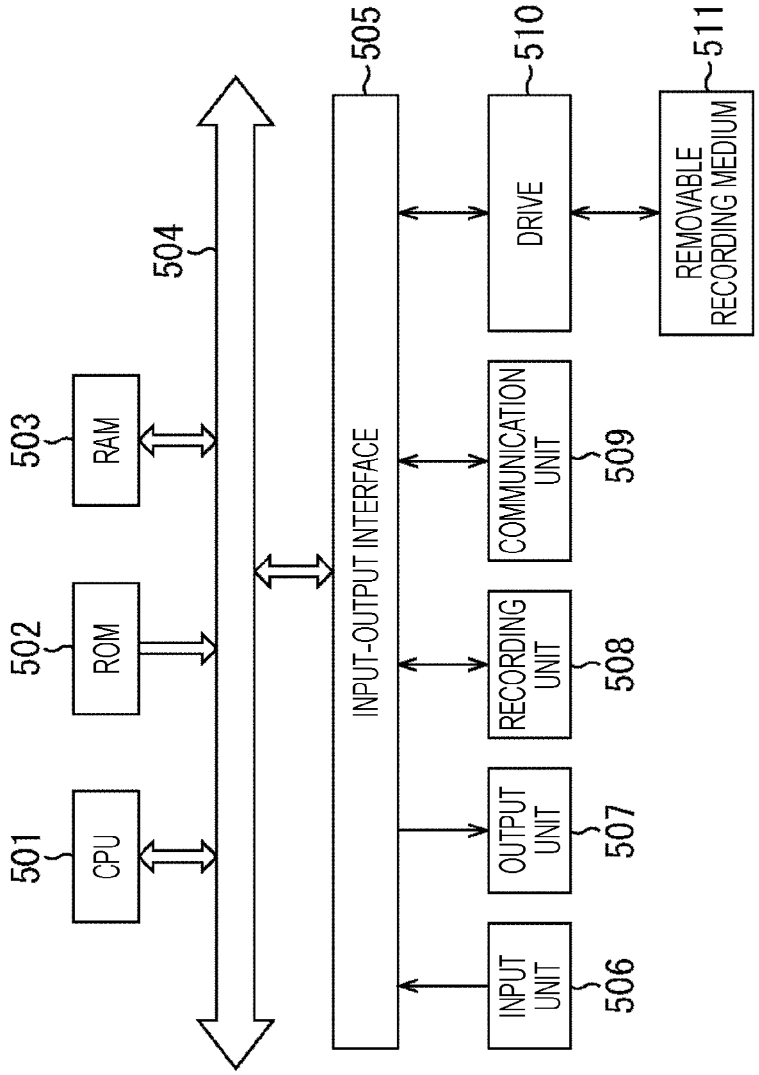
FIG. 9 illustrates an exemplary configuration of a computer.

FIG. 9 is a block diagram of an exemplary hardware configuration of a computer that performs the above flow of processing in accordance with the program.

In the computer, a central processing unit (CPU) 501, a read only memory (ROM) 502, and a random access memory (RAM) 503 are mutually connected through a bus 504.

Further, an input/output interface 505 is connected to the bus 504. An input unit 506, an output unit 507, a recording unit 508, a communication unit 509, and a drive 510 are each connected to the input/output interface 505.

The input unit 506 includes a keyboard, a mouse, a microphone, and an imaging element. The output unit 507 includes a display and a speaker. The recording unit 508 includes a hard disk and a non-volatile memory. The communication unit 509 includes a network interface. The drive 510 drives a removable recording medium 511 such as a magnetic disk, an optical disk, a magneto-optical disk, or a semiconductor memory.

For the computer having the configuration as above, the CPU 501 loads, for example, a program recorded in the recording unit 508 into the RAM 503 through the input/output interface 505 and the bus 504, and executes the program, whereby the above flow of processing is performed.

The program executed by the computer (CPU 501) can be provided by being recorded on, for example, the removable recording medium 511 as a package medium. Alternatively, the program can be provided through a wired or wireless transmission medium such as a local area network, an Internet, or digital satellite broadcasting.

In the computer, the program can be installed in the recording unit 508 through the input/output interface 505 by attachment of the removable recording medium 511 to the drive 510. Alternatively, the program can be received by the communication unit 509 through a wired or wireless transmission medium and can be installed in the recording unit 508. Besides, the program can be preinstalled in the ROM 502 or the recording unit 508.

Note that the program executed by the computer may be a program for chronologically performing the processing in accordance with the order described in the present description, may be a program for parallelly performing the processing, or a program for performing the processing with necessary timing, for example, when a call is made.

Further, embodiments of the present technology are not limited to the above embodiments, and thus various modifications can be made within the scope without departing from the gist of the present technology.

For example, the present technology can adopt a cloud computing configuration in which a single function is shared and processed by a plurality of devices through a network.

Further, each step described in the above flowchart can be performed by a single device, or can be performed by sharing among a plurality of devices.

Furthermore, in a case where a plurality of pieces of processing is included in a single step, the plurality of pieces of processing included in the single step can be performed by a single device, or can be performed by sharing among a plurality of devices.

Still furthermore, the present technology can also have the following configurations.

(1)

A signal processing apparatus including:

a difference-signal generation unit configured to generate, on the basis of an input signal and a prediction coefficient that is acquired by learning with, as training data, a difference signal based on a re-quantized signal for learning acquired by re-quantization of an original sound signal and the original sound signal, the difference signal corresponding to the input signal; and a combining unit configured to combine the difference signal generated and the input signal.

(2)

The signal processing apparatus according to (1), in which the learning corresponds to machine learning.

(3)

The signal processing apparatus according to (1) or (2), in which the input signal is identical in quantization bit length to the re-quantized signal for learning.

(4)

The signal processing apparatus according to any one of (1) to (3), in which the difference-signal generation unit includes a prediction unit configured to predict the difference signal in time domain on the basis of the prediction coefficient and the input signal.

(5)

The signal processing apparatus according to (4), in which the prediction unit includes a deep neural network (DNN).

(6)

The signal processing apparatus according to any one of (1) to (3), in which the difference-signal generation unit includes:

a complex fast Fourier transform (FFT) processing unit configured to perform complex FFT on the input signal; and a prediction unit configured to predict the difference signal in frequency domain on the basis of the prediction coefficient and a signal acquired from the complex FFT.

(7)

The signal processing apparatus according to (6), in which the prediction unit includes a DNN.

(8)

The signal processing apparatus according to any one of (1) to (3), in which the difference-signal generation unit includes:

a first prediction unit configured to predict the difference signal in time domain on the basis of the prediction coefficient and the input signal;

a complex FFT processing unit configured to perform complex FFT on the input signal;

a second prediction unit configured to predict the difference signal in frequency domain on the basis of the prediction coefficient and a signal acquired from the complex FFT; and a third prediction unit configured to predict the difference signal as a final difference signal on the basis of the prediction coefficient, a prediction result from the first prediction unit, and a prediction result from the second prediction unit.

(9)

The signal processing apparatus according to (8), in which the difference-signal generation unit further includes a complex inverse fast Fourier transform (IFFT) processing unit configured to perform complex IFFT on the prediction result from the second prediction unit, and the third prediction unit predicts the difference signal as the final difference signal on the basis of the prediction coefficient, the prediction result from the first prediction unit, and a signal acquired from the complex IFFT.

(10)

The signal processing apparatus according to (8), in which the difference-signal generation unit further includes:

a first transform unit configured to transform a first feature amount acquired from the prediction result from the first prediction unit into a second feature amount different in dimension from the first feature amount; and a second transform unit configured to transform a third feature amount acquired from the prediction result from the second prediction unit into a fourth feature amount different in dimension from the third feature amount, and the third prediction unit predicts the difference signal as the final difference signal on the basis of the prediction coefficient, the second feature amount, and the fourth feature amount.

(11)

The signal processing apparatus according to any one of (8) to (10), in which the first prediction unit, the second prediction unit, and the third prediction unit each include a DNN.

(12)

A signal processing method to be performed by a signal processing apparatus, the signal processing method including:

generating, on the basis of an input signal and a prediction coefficient that is acquired by learning with, as training data, a difference signal based on a re-quantized signal for learning acquired by re-quantization of an original sound signal and the original sound signal, the difference signal corresponding to the input signal; and combining the difference signal generated and the input signal.

(13)

A program for causing a computer to perform processing including:

a step of generating, on the basis of an input signal and a prediction coefficient that is acquired by learning with, as training data, a difference signal based on a re-quantized signal for learning acquired by re-quantization of an original sound signal and the original sound signal, the difference signal corresponding to the input signal; and a step of combining the difference signal generated and the input signal.

REFERENCE SIGNS LIST

11 Signal processing apparatus
21 Difference-signal generation unit
22 Combining unit
51 DNN
81-1 to 81-N, 81 Complex FFT processing units
82 DNN
83 Complex IFFT processing unit
111 DNN
141 Feature-amount extraction unit
142 Transform unit
143 Feature-amount extraction unit
144 Transform unit
145 DNN

The invention claimed is:

1. A signal processing apparatus, comprising:
a central processing unit (CPU) configured to:
generate, based on an input signal and a prediction coefficient that is acquired by learning with, as training data, a difference signal based on a re-quantized signal for learning acquired by re-quantization of an original sound signal and the original sound signal, the difference signal corresponding to the input signal; and
combine the generated difference signal and the input signal.

2. The signal processing apparatus according to claim 1, wherein the learning corresponds to machine learning.

3. The signal processing apparatus according to claim 1, wherein the input signal is identical in quantization bit length to the re-quantized signal for learning.

4. The signal processing apparatus according to claim 1, wherein the CPU is further configured to control prediction of the difference signal in time domain based on the prediction coefficient and the input signal.

5. The signal processing apparatus according to claim 4, further comprising a deep neural network (DNN) configured to predict the difference signal in the time domain based on the prediction coefficient and the input signal.

6. The signal processing apparatus according to claim 1, wherein the CPU is further configured to;
perform complex FFT on the input signal; and
predict the difference signal in frequency domain based on the prediction coefficient and a signal acquired from the complex FFT.

7. The signal processing apparatus according to claim 6, further comprising a deep neural network (DNN).

8. The signal processing apparatus according to claim 1, wherein the CPU is further configured to:
predict the difference signal in time domain based on the prediction coefficient and the input signal;
perform complex FFT on the input signal;
predict the difference signal in frequency domain based on the prediction coefficient and a signal acquired from the complex FFT; and
predict the difference signal as a final difference signal based on the prediction coefficient, a prediction result of the prediction of the difference signal in the time domain, and a prediction result of the prediction of the difference signal in the frequency domain.

9. The signal processing apparatus according to claim 8, wherein the CPU is further configured to:
perform complex IFFT on the prediction result of the prediction of the difference signal in the frequency domain; and
predict the difference signal as the final difference signal based on the prediction coefficient, the prediction result of the prediction of the difference signal in the time domain, and a signal acquired from the complex IFFT.

10. The signal processing apparatus according to claim 8, wherein the CPU is further configured to:
transform a first feature amount, acquired from the prediction result of the prediction of the difference signal in the time domain, into a second feature amount different in dimension from the first feature amount;
transform a third feature amount, acquired from the prediction result of the prediction of the difference signal in the frequency domain, into a fourth feature amount different in dimension from the third feature amount; and
predict the difference signal as the final difference signal based on the prediction coefficient, the second feature amount, and the fourth feature amount.

11. The signal processing apparatus according to claim 8, further comprising a deep neural network (DNN).

12. A signal processing method, comprising:
in a signal processing apparatus:
generating, based on an input signal and a prediction coefficient that is acquired by learning with, as training data, a difference signal based on a re-quantized signal for learning acquired by re-quantization of an original sound signal and the original sound signal, the difference signal corresponding to the input signal; and
combining the generated difference signal and the input signal.

13. A non-transitory computer-readable medium having stored thereon, computer executable instruction which when executed by a computer, cause the computer to execute instructions, the instructions comprising:
generating, based on an input signal and a prediction coefficient that is acquired by learning with, as training data, a difference signal based on a re-quantized signal for learning acquired by re-quantization of an original sound signal and the original sound signal, the difference signal corresponding to the input signal; and
combining the generated difference signal and the input signal.

* * * * *